H. HESS.
JOURNAL BEARING.
APPLICATION FILED AUG. 14, 1909.
1,095,863.
Patented May 5, 1914.
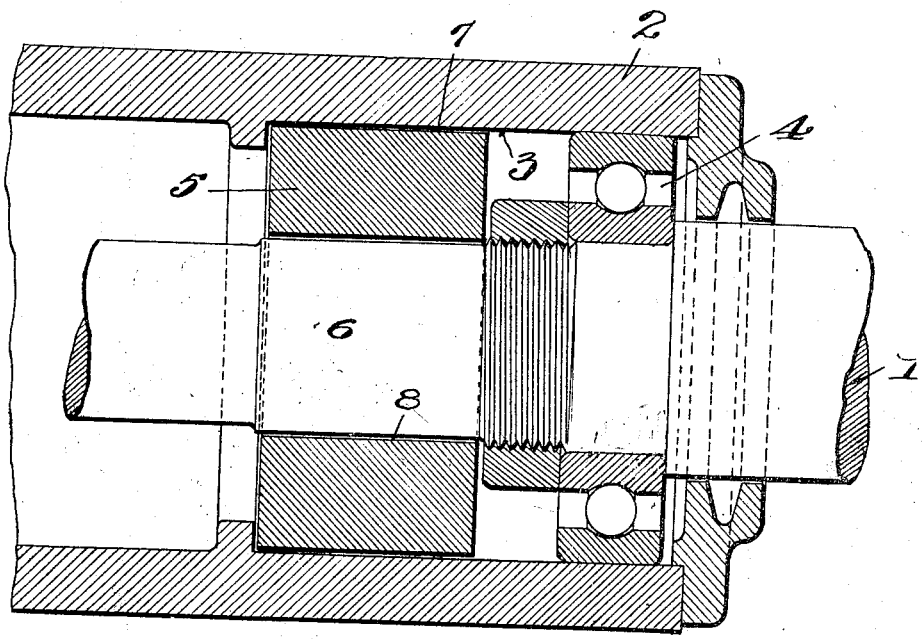
WITNESSES
C. K. Davies
S. A. Shannon
INVENTOR
Henry Hess
by Brock, Bee Ken & Smith
Attorneys

UNITED STATES PATENT OFFICE.

HENRY HESS, OF PHILADELPHIA, PENNSYLVANIA, ASSIGNOR TO THE HESS-BRIGHT MANUFACTURING COMPANY, OF PHILADELPHIA, PENNSYLVANIA, A CORPORATION OF DELAWARE.

JOURNAL-BEARING.

1,095,863.  Specification of Letters Patent. Patented May 5, 1914.

Application filed August 14, 1909. Serial No. 512,865.

*To all whom it may concern:*

Be it known that I, HENRY HESS, a citizen of the United States, and a resident of Philadelphia, in the county of Philadelphia and State of Pennsylvania, have invented a new and useful Journal-Bearing, of which the following is a specification.

My invention relates to the combination with a ball or roller bearing used to support a rotating element of means for cushioning or damping the anti-friction bearing. In carrying out my invention in one form, I support the rotating member, such as a shaft, upon a ball bearing of the well-known annular type. Although in a properly constructed bearing of this type the clearance between the balls and the races is less than the running clearance of a plain bearing, yet the point or line contact between the rolling members and the races has so little area that the oil film does not act as a cushion, but allows the rolling members to cut through it and so permits very slight vibration. In certain cases, for instance in grinding machinery, this slight vibration will manifest itself as a "chatter" that shows on the work. I have found that the introduction of an oil film which will not be cut through will eliminate the undesirable features just mentioned. A convenient means of maintaining this additional oil film between the shaft and its support consists in providing a bushing which has a suitable running fit upon the shaft and in the mounting. The lubricant finding its way into the spaces between the bushing and the shaft and the bushing and the mounting affords an effective cushion which prevents vibration or oscillation of the shaft and protects the bearing and produces other desirable operative conditions without adding to the frictional resistance between the shaft and its mounting to any appreciable extent.

The accompanying drawing shows an exemplifying structure embodying the invention. The view is a longitudinal section.

Reference character 1 designates the rotary shaft and 2, its stationary mounting having a cylindrical bore 3. The shaft may as well be the stationary member and the casing 2 the revoluble member. The shaft is supported in the casing by the ball bearing 4 which may be of the ordinary annular type. This bearing carries substantially all of the load. On the shaft and within the casing is the loose ring or bushing 5 which has a running fit with relation to the cylindrical bore of the casing and the journal 6 formed on the shaft. This running fit is indicated by the clearances 7 and 8, shown in the drawing in an exaggerated way in order that they may be readily perceived. The spaces between the bushing 5 and the shaft, and between the bushing and the housing 2 become filled with oil when the device is in use and this oil film serves to cushion the shaft in the manner which has been described.

Suitable means for maintaining the oil film such as my invention provides may be employed in connection with antifriction bearings having cylindrical or other forms of rollers.

It is to be understood that the device chosen to illustrate the invention is only representative and that the principles involved may be embodied in many forms.

I claim:

1. The combination of a rotary member, a stationary support, an anti-friction bearing intermediate the member and the support, and a bushing intermediate the member and the support and having a running fit in relation to said parts whereby an oil film is maintained between the bushing and the shaft and between the bushing and the housing.

2. The combination of a shaft and a housing having relatively rotary motion, the housing having a cylindrical bore and the shaft having a cylindrical journal, an annular ball bearing intermediate the shaft and the housing, a bushing having a running fit upon the journal and the housing, and an oil film in the spaces between the shaft and the bushing and between the bushing and the housing.

HENRY HESS.

Witnesses:
P. D. McCALLA,
JOHN S. CLEMENT.